(12) United States Patent
Cooperman et al.

(10) Patent No.: US 10,817,895 B2
(45) Date of Patent: Oct. 27, 2020

(54) MARKETING CAMPAIGN SYSTEM AND METHOD

(71) Applicant: Adobe Inc., San Jose, CA (US)

(72) Inventors: Justin Cooperman, San Francisco, CA (US); Joseph Gale Richardson, II, San Francisco, CA (US); Anna Zeman, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 302 days.

(21) Appl. No.: 15/394,959

(22) Filed: Dec. 30, 2016

(65) Prior Publication Data

US 2018/0189820 A1    Jul. 5, 2018

(51) Int. Cl.
  *G06Q 30/02* (2012.01)

(52) U.S. Cl.
  CPC ................ *G06Q 30/0243* (2013.01)

(58) Field of Classification Search
  USPC .................. 715/708, 753; 709/207
  See application file for complete search history.

(56) References Cited

U.S. PATENT DOCUMENTS

| | | |
|---|---|---|
| D401,230 S | 11/1998 | Marshall, Jr. |
| 7,113,833 B1 | 9/2006 | Brown |
| D582,936 S | 12/2008 | Scalis |
| D592,221 S | 5/2009 | Rehling |
| 7,958,101 B1 | 6/2011 | Teugels |
| D656,509 S | 3/2012 | Thai |
| D660,311 S | 5/2012 | Klein |
| D673,166 S | 12/2012 | Mori |
| 8,812,448 B1 | 8/2014 | Anderson |
| D718,322 S | 11/2014 | Hwang |
| D727,944 S | 4/2015 | Jarzabek |
| D747,341 S | 1/2016 | Zhang |
| D750,644 S | 3/2016 | Bhutani |
| D751,571 S | 3/2016 | Lee |
| 9,323,503 B1 | 4/2016 | Fontes |
| D766,292 S | 9/2016 | Rubio |
| D767,604 S | 9/2016 | Wiley |
| D770,487 S | 11/2016 | Li |
| D778,955 S | 2/2017 | Aoshima |
| D784,374 S | 4/2017 | Hao |
| 9,646,013 B2 | 5/2017 | Swengler |
| D799,517 S | 10/2017 | Lim |
| D803,858 S | 11/2017 | Su |

(Continued)

OTHER PUBLICATIONS

"148 Apps.com", htt;://www.148apps.com/app/976621855/, Apr. 30, 2015.

(Continued)

*Primary Examiner* — Saba Dagnew
(74) *Attorney, Agent, or Firm* — Keller Jolley Preece

(57) ABSTRACT

A computer implemented method for generating a GUI includes presenting a prompt for an event, receiving an input for an event, and displaying an event as an event card in response to the input for that event. The method also includes presenting a prompt for at least one filter, receiving an input for at least one of filter; and displaying the at least one filter as a card in response to the input for the at least one filter. The method also includes associating a logical operation with the event and the at least one filter, and displaying the logical operation between the event card and the filter card.

20 Claims, 14 Drawing Sheets

(56) References Cited

U.S. PATENT DOCUMENTS

| | | | |
|---|---|---|---|
| D813,270 S | 3/2018 | Stephens | |
| D822,702 S | 7/2018 | Gandhi | |
| D823,868 S | 7/2018 | Eissa | |
| D823,870 S | 7/2018 | Yan | |
| D824,409 S | 7/2018 | Harvey | |
| D824,938 S | 8/2018 | Zeller | |
| D833,458 S | 11/2018 | Blechschmidt | |
| D833,459 S | 11/2018 | Blechschmidt | |
| D833,460 S | 11/2018 | Blechschmidt | |
| D834,603 S | 11/2018 | Feldman | |
| D845,974 S | 4/2019 | Cooperman et al. | |
| D849,029 S | 5/2019 | Cooperman et al. | |
| 2002/0032696 A1 | 3/2002 | Takiguchi | |
| 2002/0054167 A1 | 5/2002 | Hugh | |
| 2002/0091738 A1 | 7/2002 | Rohrabaugh | |
| 2003/0169284 A1* | 9/2003 | Dettinger | G06F 17/30398 715/708 |
| 2004/0008224 A1 | 1/2004 | Molander | |
| 2004/0049416 A1 | 3/2004 | Alison, III | |
| 2004/0056903 A1 | 3/2004 | Sakai | |
| 2005/0289110 A1 | 12/2005 | Giampaolo | |
| 2007/0016586 A1 | 1/2007 | Samji | |
| 2008/0163122 A1 | 7/2008 | Wolf | |
| 2008/0168152 A1 | 7/2008 | Weizman | |
| 2008/0228893 A1* | 9/2008 | MacDonald | G06Q 30/02 709/207 |
| 2009/0049066 A1 | 2/2009 | Wu | |
| 2009/0222420 A1 | 9/2009 | Hirata | |
| 2009/0292681 A1 | 11/2009 | Wood | |
| 2010/0262595 A1 | 10/2010 | Park | |
| 2012/0151438 A1 | 6/2012 | Bach | |
| 2012/0226662 A1 | 9/2012 | Swengler | |
| 2012/0259827 A1 | 10/2012 | Greene | |
| 2013/0151992 A1 | 6/2013 | Greenawalt | |
| 2014/0075336 A1 | 3/2014 | Curtis | |
| 2014/0143667 A1* | 5/2014 | Kernick | G06F 3/0482 715/708 |
| 2014/0244618 A1 | 8/2014 | Lynch | |
| 2016/0044073 A1* | 2/2016 | Rosenberg | G06F 16/3329 715/753 |
| 2016/0275095 A1 | 9/2016 | Yokoyama | |
| 2017/0060893 A1 | 3/2017 | Taveniju | |
| 2017/0161292 A1 | 6/2017 | Sever | |
| 2017/0178034 A1 | 6/2017 | Skeen | |
| 2017/0323025 A1 | 11/2017 | Tian | |
| 2017/0351720 A1 | 12/2017 | Alekseyev | |
| 2017/0357382 A1 | 12/2017 | Miura | |
| 2019/0012753 A1 | 1/2019 | Elias et al. | |

OTHER PUBLICATIONS

"Compare Means—SPSS Tutorials—LibGuides at Kent State University", https://libguides.llibrary.kent.edu/SPSS/CompareMeans.
"Either/Play Play App", Sep. 17, 2014.
"My Weekend Residence Eblast/The Ocean", Win a Nintendo Switch-enter the FullStory Engage your Rage Playoff—by Helium Creative, Jan. 28, 2016.
"Question Creation and Modification", School of Information Innovative Learning. Global Connections; http://schoolapps.sjsu.edu/facultyhandbook/phpquestionnaire/questions/types/radio/create.html.
"Top 10 Paid survey Apps for Teenagers to Earn Money", http://teensurveys.co.uk/paid-survey-apps/.
Cardoso, "Bootstrap Buttons", dribbble Toggle navigation, Dec. 14, 2014.
Frantar, "Email Promoting New Authentication Feature", Frantar, Ivan, Email promoting new authentication feature, posted at dribbble, posting date Jun. 27, 2016. Available from Internet URL: https://dribbble.com/shots/2802003-Email-promoting-new-authentication-feature> (Year: 2016), 2016.
Nusyirwan, "Another View of "Rama"", https://dribble.com/shots/1405790-Another-View-of-Rama, Feb. 3, 2014.
U.S. Appl. No. 29/589,348, filed Feb. 15, 2019, Notice of Allowance.
U.S. Appl. No. 29/589,348, filed Jan. 25, 2018, Office Action.
U.S. Appl. No. 29/589,348, filed Jul. 27, 2018, Office Action.
U.S. Appl. No. 29/589,348, filed Dec. 12, 2018, Notice of Allowance.
U.S. Appl. No. 29/589,348, filed Dec. 10, 2018, Notice of Allowance.

* cited by examiner

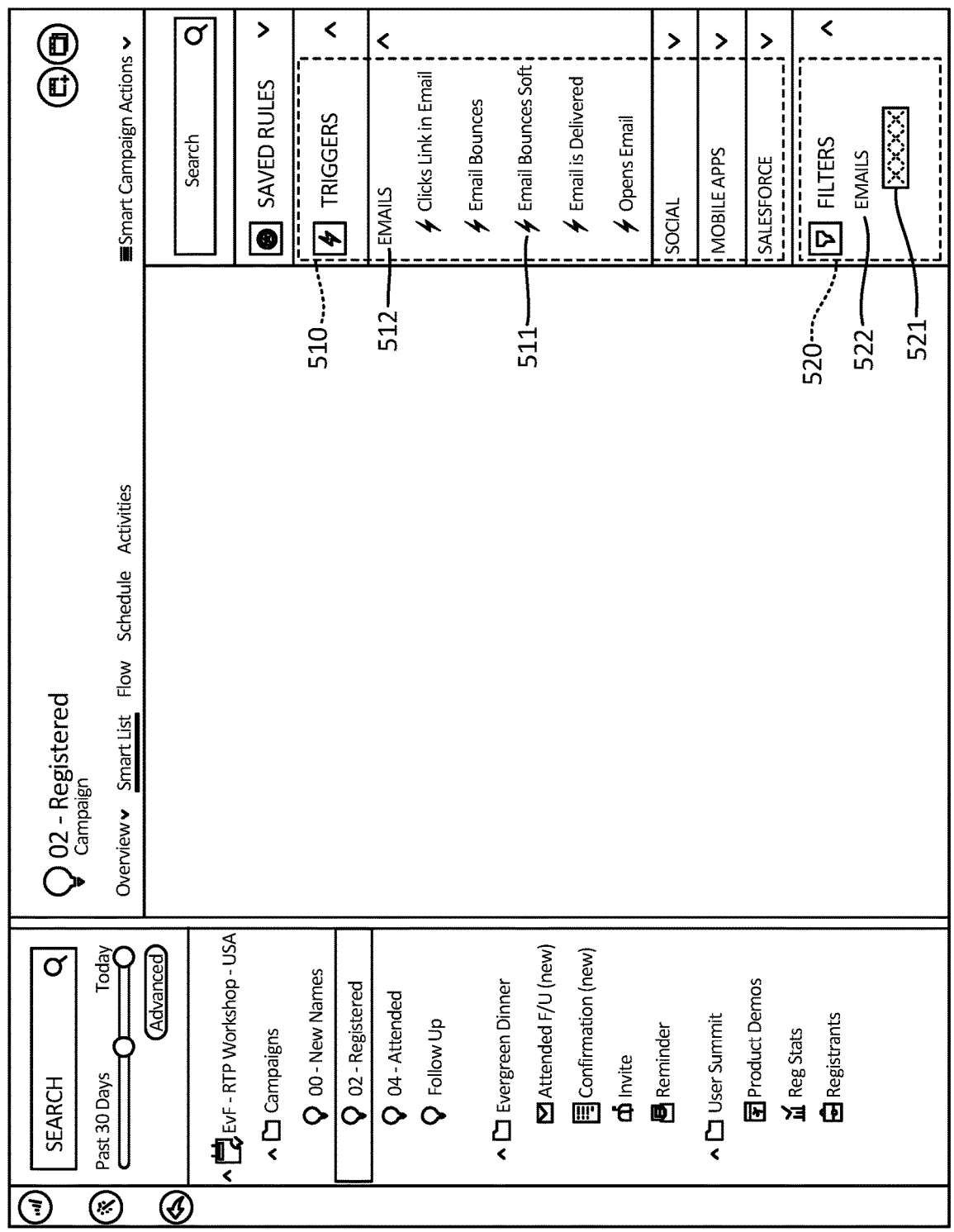

MARKETING CAMPAIGN SYSTEM AND METHOD

TECHNICAL FIELD

Various embodiments described herein relate to a marketing campaign system. More specifically the marketing campaign system presents prompts for events and triggers. The marketing campaign can also include one or more filters based on attributes. The marketing campaign system and method receives inputs related to the triggers and filters and presents the triggers and the filters visually as cards. Presents card visually for users to organize or set or configure the audience for a marketing campaign. The cards are linked with logical operations.

BACKGROUND

Marketing campaigns can be generally categorized into two types. A first type of marketing campaign generally is applicable to a group of people that share one or more attributes or behavior patterns. The second type of marketing campaign is a scheduled campaign with a set audience defined by the one or more attributes or behavior patterns. The group is defined with attributes or filters. A start date is set and one or more actions occur commencing at a start date. In some instances, there may be reoccurrences scheduled for later dates. The second type of marketing campaign that occurs is initialized by a trigger. These can apply to an individual or a group of individuals. Actions flow after the trigger initiates the marketing campaign.

In either case, logical operations are useful in defining a marketing campaign. Marketers that plan these campaigns, in many instances, may not be familiar with logical expressions that define the audience for the campaign. In some instances, the campaign structure may be presented as a visual representation called a journey. A journey includes the actions that flow from a trigger, or that flow after the scheduled start time. The journey is generally represented as a set of vertical strings or elongated arrows. Some of the branches include multiple sub branches. The marketer designing or programming one type of campaign is expected to know what a branch depicts, as well as the sub branches. Such programming may be simple at first, but can quickly become complex. The visual representations can also get complicated. The marketer using a journey based system can get lost and confused quite quickly with only minor increases in complexity of logic associated with a marketing campaign.

BRIEF DESCRIPTION OF THE DRAWINGS

FIG. 5 is a GUI associated with the inventive marketing campaign system presenting prompts for at least events and filters, according to an example embodiment.

DETAILED DESCRIPTION

Figure 1:
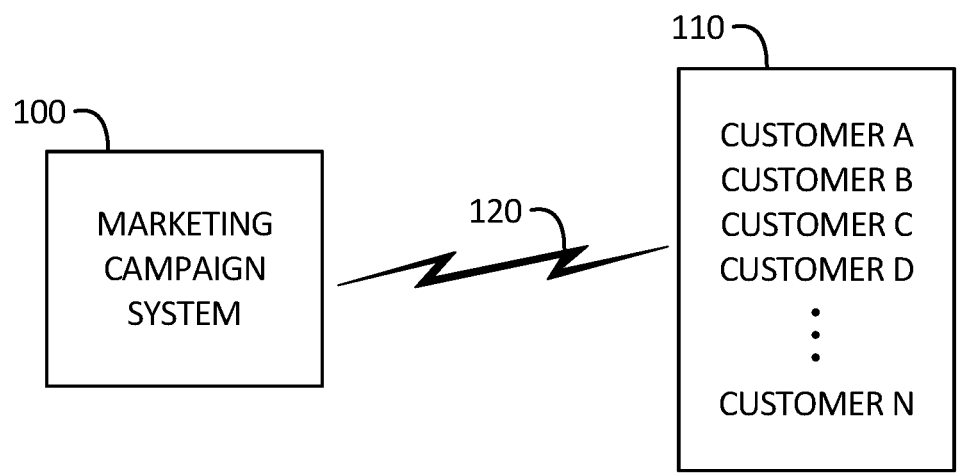
FIG. 1 schematic view of a marketing campaign system that interconnects a set of customers and a marketing entity, according to an example embodiment.

While the following describes the present system and method in detail, it is beneficial to provide certain definitions.

Card: A card is a common UI pattern to represent a distinct object in a GUI system.

Marketing campaign: A campaign to promote a product or service for sale through different marketing channels including mobile computing systems (e.g., phones, laptops, desktops), social media platforms, emails, web sites, and other online platforms. Campaigns do not have to rely solely on advertising and can also include demonstrations, word of mouth and other interactive techniques, such as the aforementioned email, social media, and other computer contacts. The efforts of a company or a third-party marketing company to increase awareness for a particular product or service, or to increase consumer awareness of a business or organization. A marketing campaign has a limited duration. Marketing campaigns are a main method for both communicating with a person's or company's market to reinforce their positioning, and for customer acquisition. Good campaigns follow a theme and include a series of touches with the market. A marketing campaign can include operational activities, like data management of an entity's clients. The operational activities are activities that may not be seen by a customer.

Flow Action: An output operation within a flow of a marketing campaign. A flow can include one action or several actions. A single point of execution in a flow.

AND: A Logical operator used to perform a logical conjunction on two Boolean expressions.

Boolean expression: An expression that yields a Boolean value (true or false). Such expressions can involve comparisons (testing valued for equality or, for non-Boolean values, the <[less then] or >[greater than] relation), and logical combination (using logical operators such as AND, OR, and XOR) of Boolean expressions.

Logical operator: Logical operators (AND, OR, XOR, NOT, EQUALS) are used to manipulate TRUE/FALSE values.

Display: A screen or monitor of a computer system.

Event: An action or activity detected by the marketing system. Events can be a user activity, such as visiting a webpage or opening an email, or system occurrences, such as entering a client's marketing system for the first time.

Filter: An attribute of one or more members of a group. Multiple filters can be used to define a group of individuals. A group can be a single individual.

Flow Action: A single point of execution within a campaign's flow. A specific defined series of activities used in a marketing campaign.

Graphical User Interface (GUI): An interface that takes advantage of the computer's graphics capabilities to make the program easier to use with input devices (e.g., touch screen, keyboard), pointing devices (e.g., a mouse, touchpad, or stylus), menus, and icons.

Input: Data provided to a computer. Input can take a variety of forms, from commands you enter via the input device or pointing device.

Logical operation: An expression that uses logical values and operators.

Operator: A symbol that represents a specific logical operation.

Output: The results of an operation performed by a computer such as the results of a Logical operation.

Prompt: A symbol on a display screen indicating that the computer is waiting for input.

Smart Campaign: The operator inside a marketing automation system that allows the user to setup digital marketing campaigns, performing actions on leads based on events and/or attributes.

Now, various example embodiments of the marketing campaign system and method will be further detailed with reference to the FIGs. that are described briefly above and further detailed below.

FIG. 1 schematic view of a marketing campaign system that interconnects a set of customers and a marketing entity, according to an example embodiment. A company or other entity will maintain a marketing campaign system 100. The marketing campaign system 100 is used to communicate and market to a group of customers 110. The customers can be any set of customers, such as current and past customers. Some can be obtained from purchased lists. Some may have registered on a company website or the like. The customers 110 are connected over various marketing channels, as depicted by the bolt symbol 120. The channels can include Email, social media, mobile applications, and customer relationship management software for managing customer data and customer interactions, accessing business information and the like. The channel 120 can also include other channels.

Figure 2:
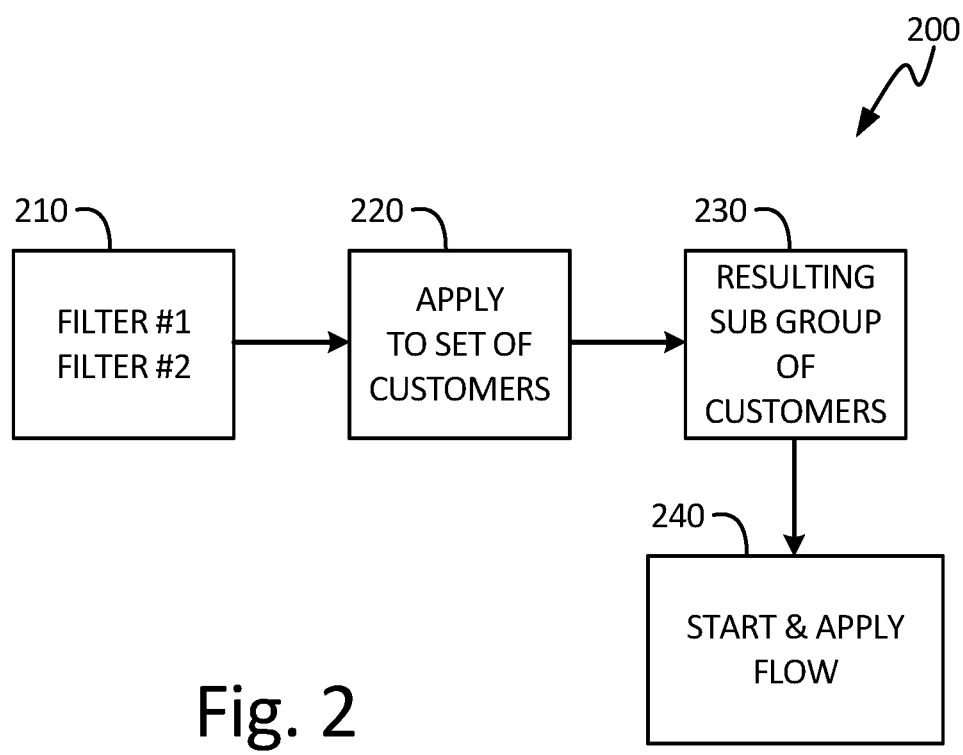
FIG. 2 is a schematic flow diagram of a first type of marketing campaign, a scheduled, set audience campaign, according to an example embodiment.

FIG. 2 is a schematic flow diagram of a first type of marketing campaign 200, according to an example embodiment. The first type of marketing campaign is a batch campaign. As shown in FIG. 2, a set of filters 210 is applied to a set of customers 220. The filters 210 are attributes or behavioral patterns of the customers. The filters, depicted as filter #1 and filter #2, can really be any attribute or behavioral pattern. For example, the attribute might be customers over a certain age. Other attributes might be male/female. Still other attributes that could be filters could be the state in which the customer lives or a category of items they have purchased. The filters are used to define a subgroup of customers 230. A batch campaign launches at a specific time and affects a specific set of customers all at once. An example would be sending an email to all customers in California. The marketing action taken can be one action or a series of actions and is generally referred to as a flow 240. Batch campaigns will only have filters in the audience definition. No triggers or events can trigger an action flow of a batch campaign. The flow is scheduled to start at a time. At the start time, the flow 240 starts and the flow is applied to the subgroup of customers or the leads from the customer list which is the subgroup of customers 230. Other actions may take place after the start time as defined by the flow. The flow 240 or set of actions can be scheduled for recurrences, such as daily, weekly, and monthly. Actions can also run just one time. A batch campaign uses filters to define or find people in a customer database that qualify for the marketing campaign. The batch campaign runs the flow 240 on all of the subgroup of customers 230 defined by the filters 210.

Figure 3:
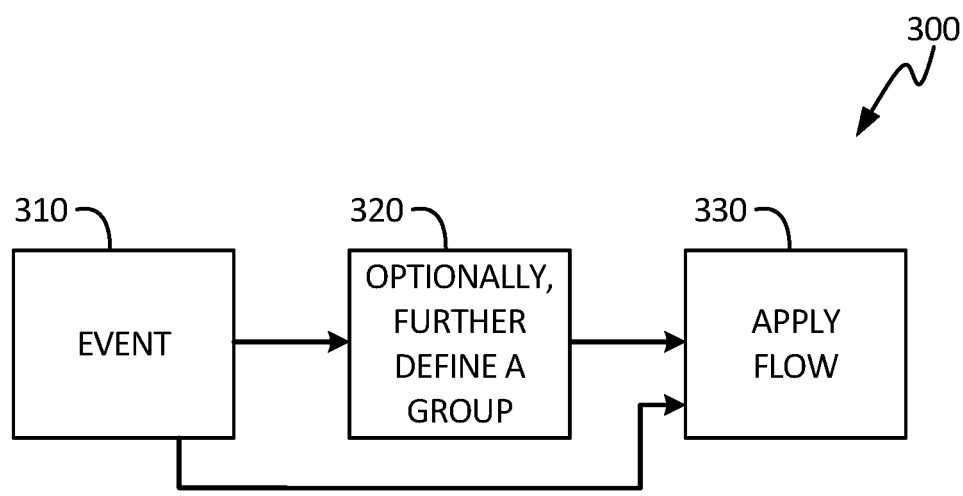
FIG. 3 is a schematic flow diagram of a second type of marketing campaign, a triggered campaign, according to an example embodiment.

FIG. 3 is a schematic flow diagram of a second type of marketing campaign 300, according to an example embodiment. The second type of marketing campaign 300 is a triggered campaign. An event 310 serves as a trigger to start a triggered campaign. In some embodiments, a triggered campaign 300 affects one customer at a time, based on a triggered event 310. There can be more than one trigger. There is no logic between the triggers since any of the triggers will trigger or start the marketing campaign. A smart campaign can run on one person at a time based on live events by adding triggers, which puts the smart campaign in trigger mode. A smart campaign with triggers runs in trigger mode. Filters can be added as an option. In a smart campaign with both triggers and filters, a trigger starts the campaign (as depicted by being at the top of the smart campaign) and only customers who satisfy the filter criteria have a flow 330 applied to the defined group 320. It should be noted that the event 310 can include a trigger and additional constraints. In still further embodiments, the trigger mode can include multiple triggers/events. In this embodiment, any trigger/event in a trigger mode smart campaign will immediately start the campaign. Once the triggered smart campaign is started, any optionally applied filters determine whether the person linked to that trigger will be able to continue in the campaign into the flow 330.

Figure 4:
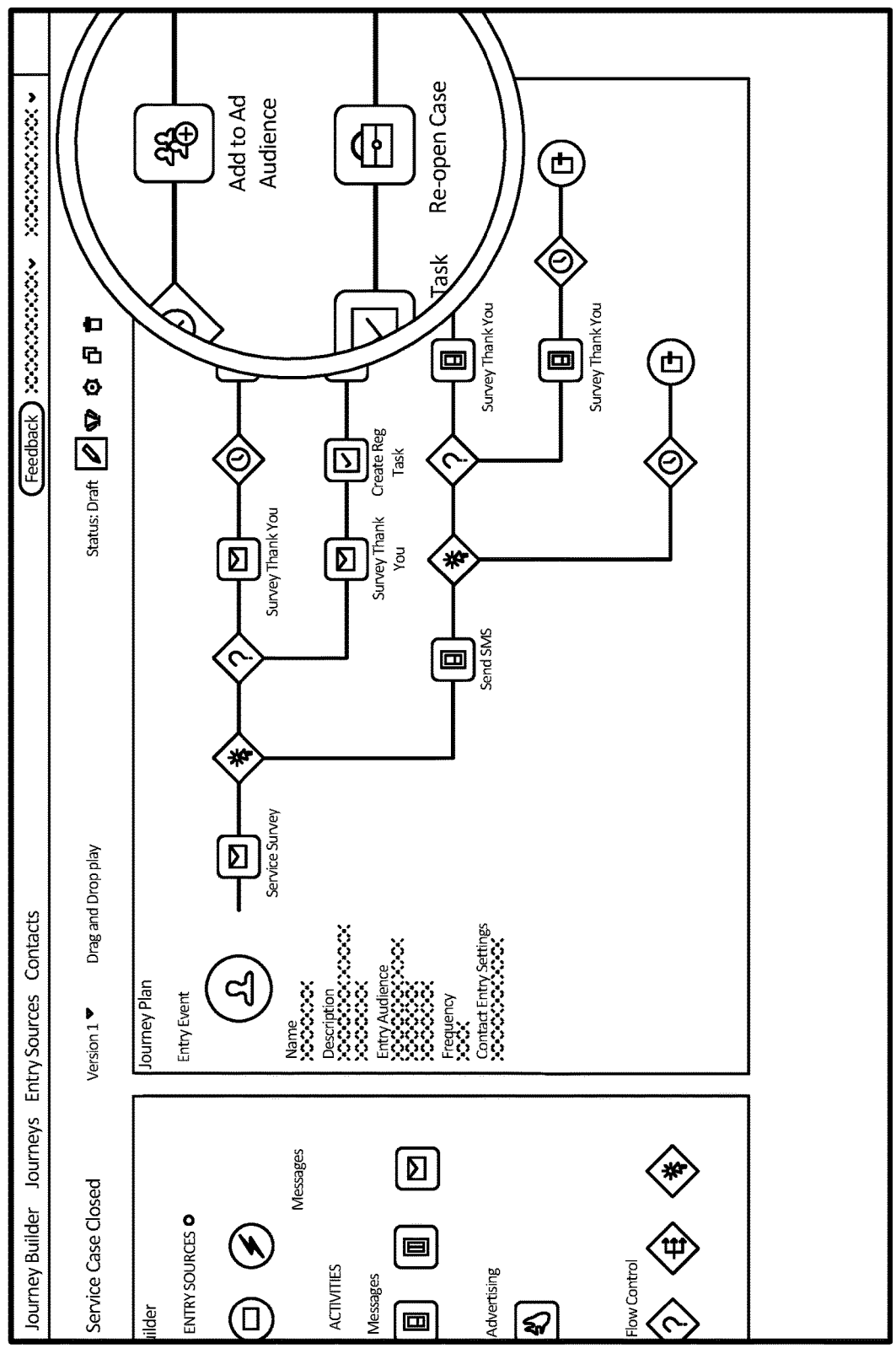
FIG. 4 is a prior art GUI associated with a system that depicts logic associated with a marketing campaign as a journey.

FIG. 4 is a GUI associated with a system that depicts logic associated with a marketing campaign, according to the prior art. In the prior art, a marketing campaign is depicted as a series of elongated vertical lines. Events and actions result in branches and actions which drop down and produce a series of additional vertical lines. These can be hard to follow. First of all, the branches and the main trunk require a person viewing the marketing campaign to move vertically on a computer screen. In addition, as the marketing campaign becomes more complex, movement to review the data associated with the prior art marketing campaign includes further and further vertical movement as well as horizontal movement (scrolling up or down on a computer screen). In addition, the marketing campaigns typically include logic.

This is one type of marketing campaign that includes a common shortcoming of prior art systems—namely that there is no depiction of a particular logical operation at the GUI. Many times it is very hard for the marketer reviewing the marketing campaign to determine the logic associated with the campaign. The marketer has to be trained to learn what the various branches represent, especially as the marketing campaign increases in complexity. Some may be events and others may be filters. In short, for less experienced users, the prior art marketing campaigns, such as the one shown in FIG. 4, can be confusing.

FIGS. 5-9 depict screen shots from a GUI 500 showing various prompts and lists of filters and events that are connected by logical connectors. As compared to FIG. 4., the marketing campaign shown in the following FIGS. are much easier to follow. Cards are connected to one another using connectors that depict a logical operation that operates between the cards. This GUI will be further detailed in the following discussion related to FIGS. 5-10.

FIG. 5 is a GUI 500 associated with the inventive marketing campaign system that presents an event prompt area 510 that lists a number of different events 511. The events are listed under a trigger heading. When an event occurs, the marketing campaign is triggered. The event prompt area 510 includes subheadings 512 for groupings of event prompts. The event prompt area 510 is surrounded by a broken line which is not actually shown on the GUI 500. Below the subheadings 512 are the actual events or triggers. In addition, the GUI area includes a filter prompt area 520 that includes a number of different subheadings 522 for groupings of different filters. The filter prompt area 520 is surrounded by a broken line which is not actually shown on the GUI 500. The actual filters 521 are listed under the subheadings 522. Of course, there are different ways to list or show events 511 and filters 521 in the various prompt areas. In another embodiment, the events could be listed alphabetically and the filters could also be listed alphabetically, according to an example embodiment. It should be noted, that the user can add to the listing of events 511. The list presented may not be exhaustive. Events may be added to the list for future use. Similarly, the listing of filters 521 is also not necessarily exhaustive. Additional filters can be added to the list.

Figure 6A:
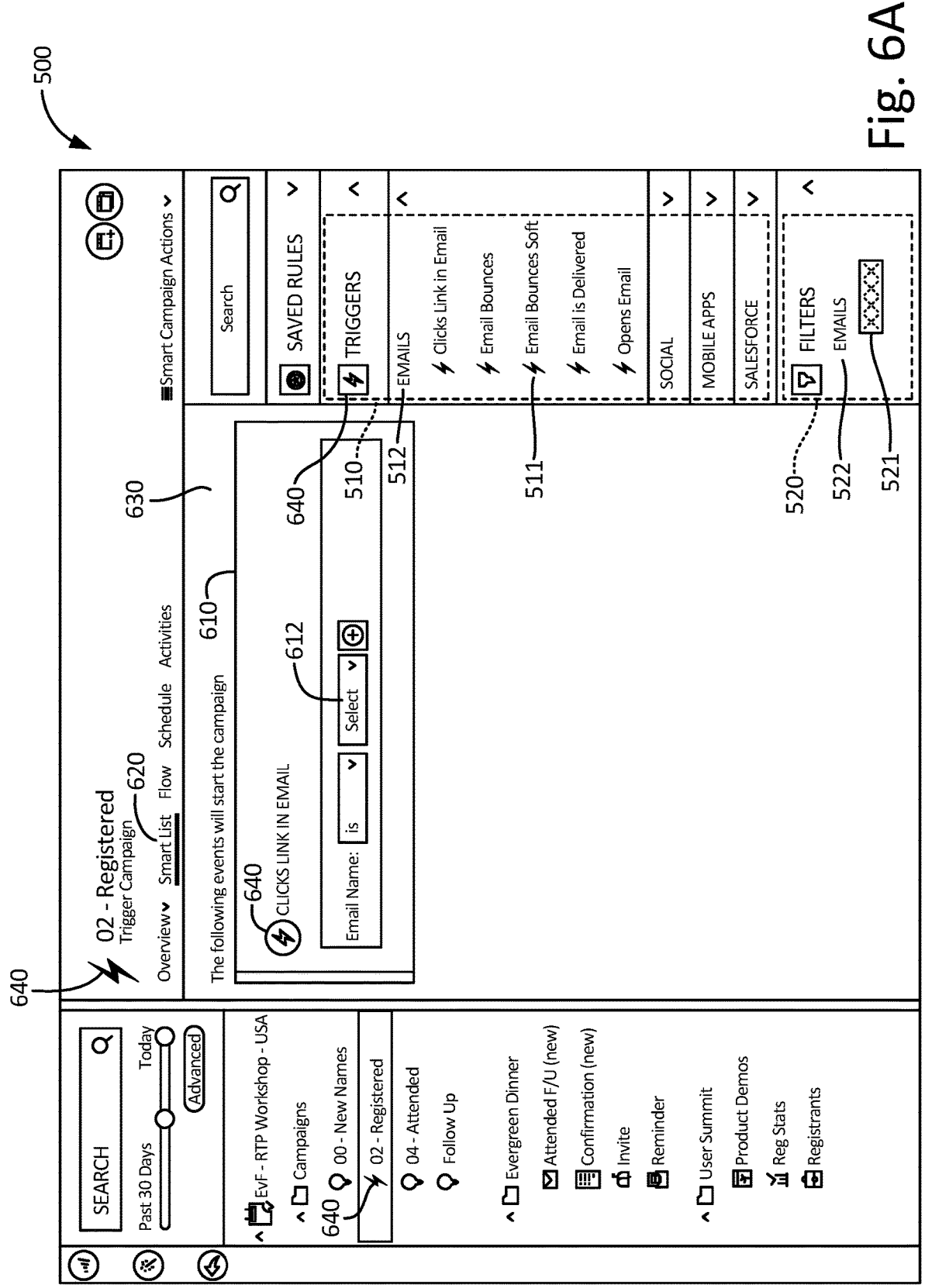
FIG. 6A is a GUI associated with the inventive trigger marketing campaign system that displays an event card in response to receiving an input for an event prompt, according to an example embodiment.

FIG. 6A is the GUI 500 associated with the inventive marketing campaign system that displays an event card 610 in response to receiving an input produced when an event prompt is selected, according to an example embodiment. For the sake of illustration, a triggered campaign is illustrated in the GUI 500. In a triggered campaign, when an event occurs, the campaign starts or is triggered in response to the event occurring. The GUI 500 includes a smart list 620 tab. When the smart list tab 620 is selected, a smart list area 630 is shown on the GUI. The smart list area 630 includes a set of one or more cards that are part of the marketing campaign. The user builds a trigger marketing campaign by selecting events and, optionally, filters from the event prompt area 510 and the filter prompt area 520. As shown in FIG. 6A, selecting an event entitled "CLICKS LINK IN EMAIL" in the event prompt area 510 produces an input which is received by the marketing campaign system 100 (shown in FIG. 1). In response to this input, an event card entitled "CLICKS LINK IN EMAIL" is placed on the smart list, and more specifically displayed on the smart list area 630 of the GUI 500. The event card 610 includes additional prompts 612 that may further specify which link of many was actually clicked. Of course, clicking a link in email specified will be the event that triggers the marketing campaign. The event card 610 represents one variable in a Boolean expression that can be used to describe or specify the marketing campaign. Subsequent cards, such as filter cards, must be ANDed with the event card. As an example, the filter may simply be a filter that indicates the person filling out the specified form is new and not found on any current customer listing or in the database. A flow that could be triggered, in the example, might be a welcoming Email. Other marketing channels could also be used to send a welcome to the new customer. The event card 610 can be identified generally by a symbol, such as symbol 640 shown in FIG. 6. The symbol 640 can be found in the event prompt area 510 as well as on the event prompt card 610. The event symbol will also be found on the header for a triggered campaign as well as in the tree. It should be noted that the right-hand pane of the marketing campaign system 500 shows a number of events and many more events can be added. The actual events are shown when a subheading is selected. The listing of filters can also be added to as depicted by the box displayed at the bottom of the right hand pane showing the entry "XXXX" at the bottom of the pane. This indicates that there are many possible filters that can be added here as a listing of prompts for a user to select.

Figure 6B:
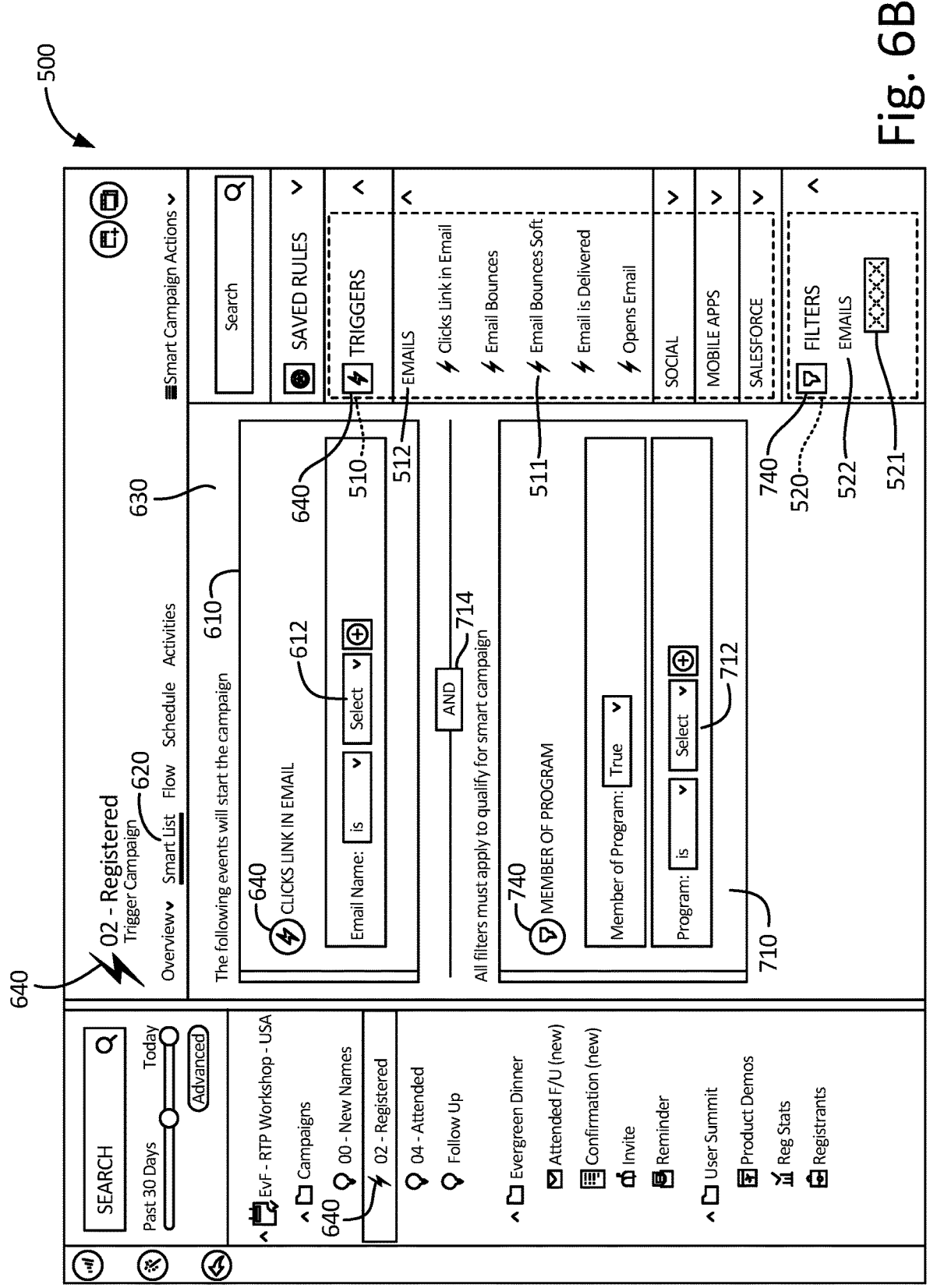
FIG. 6B is a GUI associated with the inventive trigger marketing campaign system that displays the addition of a filter card in response to receiving an input for a filter prompt, according to an example embodiment.

FIG. 6B shows a display after an event has been selected in a trigger campaign. FIG. 6B is a GUI 500 associated with the inventive marketing campaign system that also displays a filter card 710 in response to receiving an input for a filter prompt 521 selected from the filter prompt area 520, according to an example embodiment. In other words, FIG. 6B shows the display 500 after an event input has been received and an event card is displayed, and after a filter input has been received and a filter card is displayed. The filter card 710 is added to the smart list in the smart list area 630. The filter card 710 is ANDed with the event card 610 that was previously selected (shown in FIG. 6A). As shown in FIG. 6B, selecting a filter entitled "MEMBER OF PROGRAM" in the filter prompt area 520 produces an input which is received by the marketing campaign system 100 (shown in FIG. 1). In response to this input, a filter card 710 entitled "MEMBER OF PROGRAM" is placed on the smart list. The filter card 710 includes additional prompts 712 that further specify which program of many available the customer was a member of. Of course, in order to begin the trigger campaign, the customer must be a member of the specified program. The filter card 710 is an additional variable in a Boolean expression that can be used to describe or specify the marketing campaign. Since the event must occur to trigger the trigger marketing campaign, a Boolean variable "AND" is placed between the event card 610 and the filter card 710. This could be the end of the definition of the event and filter that trigger the triggered marketing campaign. If another filter is selected, the filter card 710 is provided with a default Boolean operator of "AND". Subsequent cards, such as filter cards, can be ANDed with the next filter card. It should be noted that the builder of the marketing campaign does not have to use an "AND" operation. A drop-down menu can be presented so that the builder of the marketing campaign could be presented with a number of possible logic scenarios. The drop-down menu presents one of three options to the user. The selections are "All Filters Must Apply" (AND), "Any Filters Can Apply" (OR) and "Advanced". When "All Filters Must Apply" is selected all the attributes or filter cards in the smart list area 630 are ANDed with one another. When "Any Filters Can Apply" is selected all the attributes or filter cards in the smart list area 630 are effectively ORed with one another. When "Advanced" is selected, a formula field is presented to the user, allowing any of the filters or attributes to be "ANDed" or "ORed" in an advanced format. The "Advanced" feature will be discussed below with respect to FIG. 9. When the "Advanced" option is used, the filter cards are numbered and a formula relating all of the numbered filter cards is applied. The filter card 710 includes a filter symbol 740 to visually depict that the card 710 is a filter card 710. The same symbol 740 is found in the filter prompt area 520.

Figure 7A:
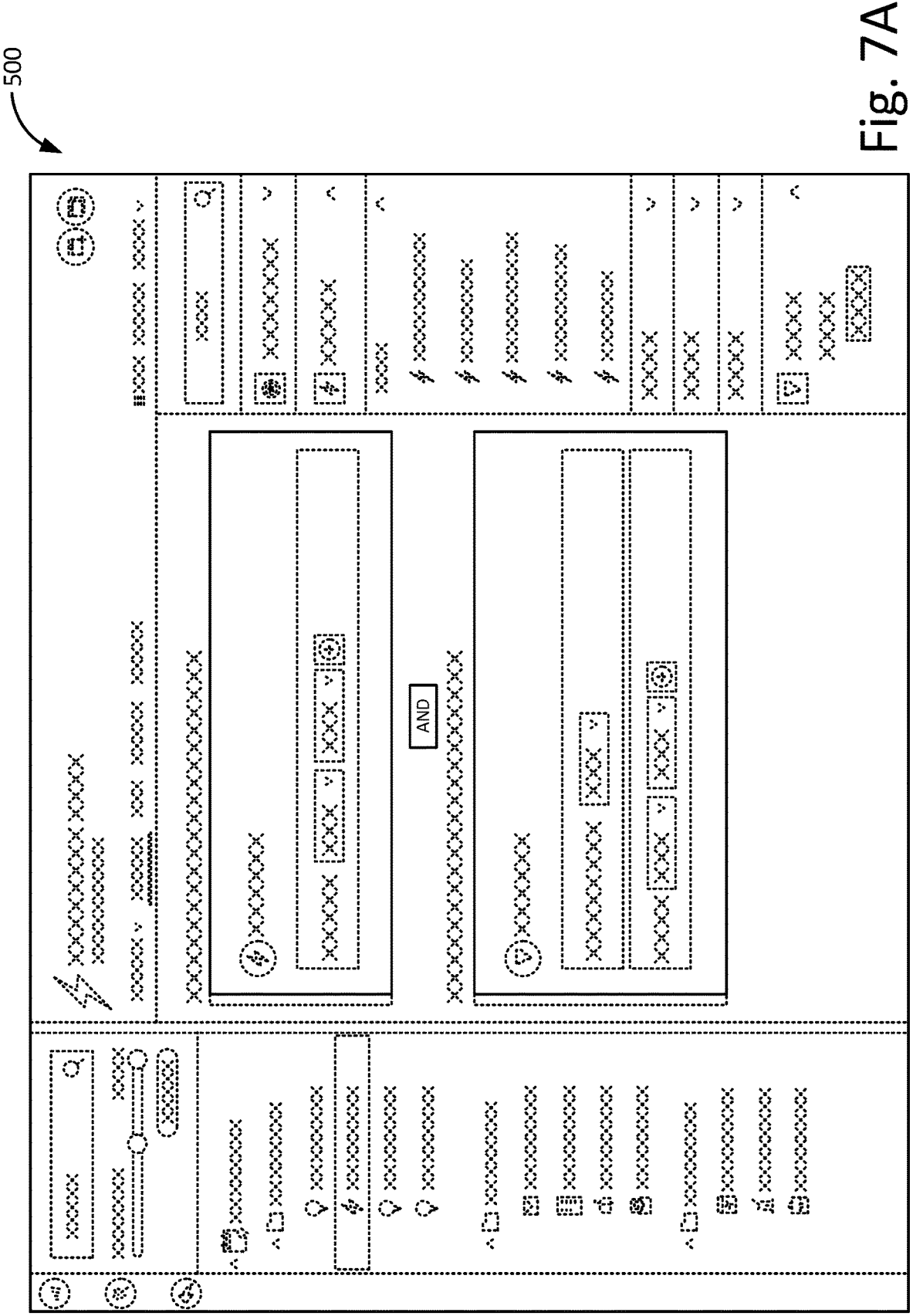
FIG. 7A is a GUI associated with the inventive trigger marketing campaign system that displays an event card and a filter card in response to receiving an input for a trigger prompt, and another input for a filter prompt, according to an example embodiment.

FIG. 7A is a GUI associated with the inventive trigger marketing campaign system that displays an event card ANDed with a filter card in response to receiving an input for an event prompt and an input for a filter prompt, according to an example embodiment. FIG. 7A is a duplicate of FIG. 6B with various fields filled in with generic XXXXX's for the information associated with the triggers, and the filters. This information includes the titles in the event card and the titles in the filter card. This is meant to depict that the titles of the cards, the events, and the filters can be of various types. New events and filters can be input.

Figure 7B:
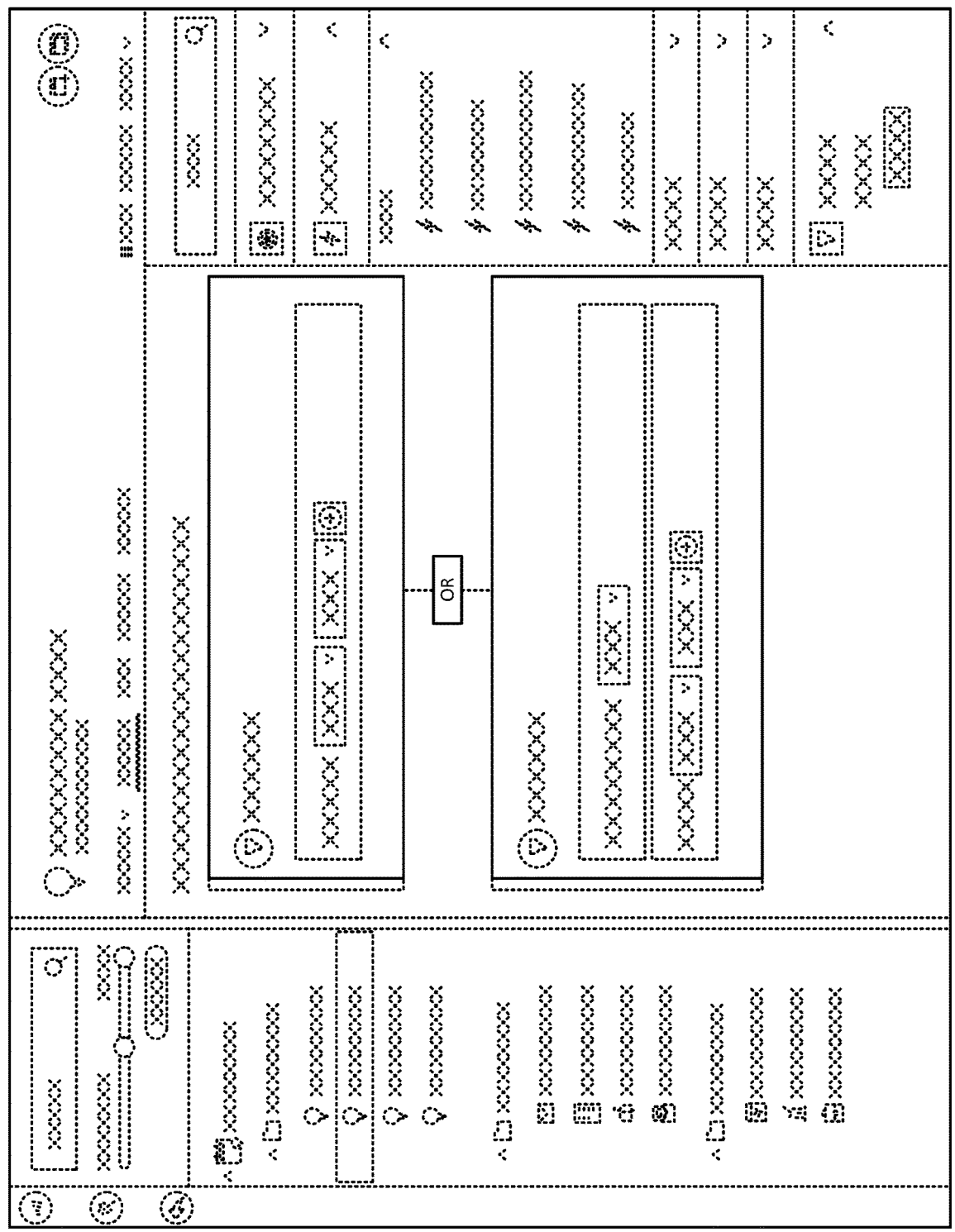
FIG. 7B is a GUI associated with the inventive batch marketing campaign system that displays a pair of filter cards in response to receiving an input for filter prompts, according to an example embodiment.

FIG. 7B is a GUI associated with the inventive batch marketing campaign system that displays two filter cards in response to receiving an input for two filter prompts, according to an example embodiment. FIG. 7B includes various fields filled in with generic XXXXX's for a first filter and for a second filter, such as for the title in the first filter card and the title in the second filter card. The two cards are connected by an OR logical operator. Above the filter cards shown will be a prompt indicating that a group is defined by "Any of the Attributes". It is contemplated that the filters can be of various types. New events and filters can be input. In other words, at least two filter cards are shown in this depiction of a batch campaign. Optionally more filter cards can be added. The additional filter cards may be off the screen shown, such as when the user scrolls down in the smart list area 630 (shown in FIGS. 6A and 6B).

Figure 8:
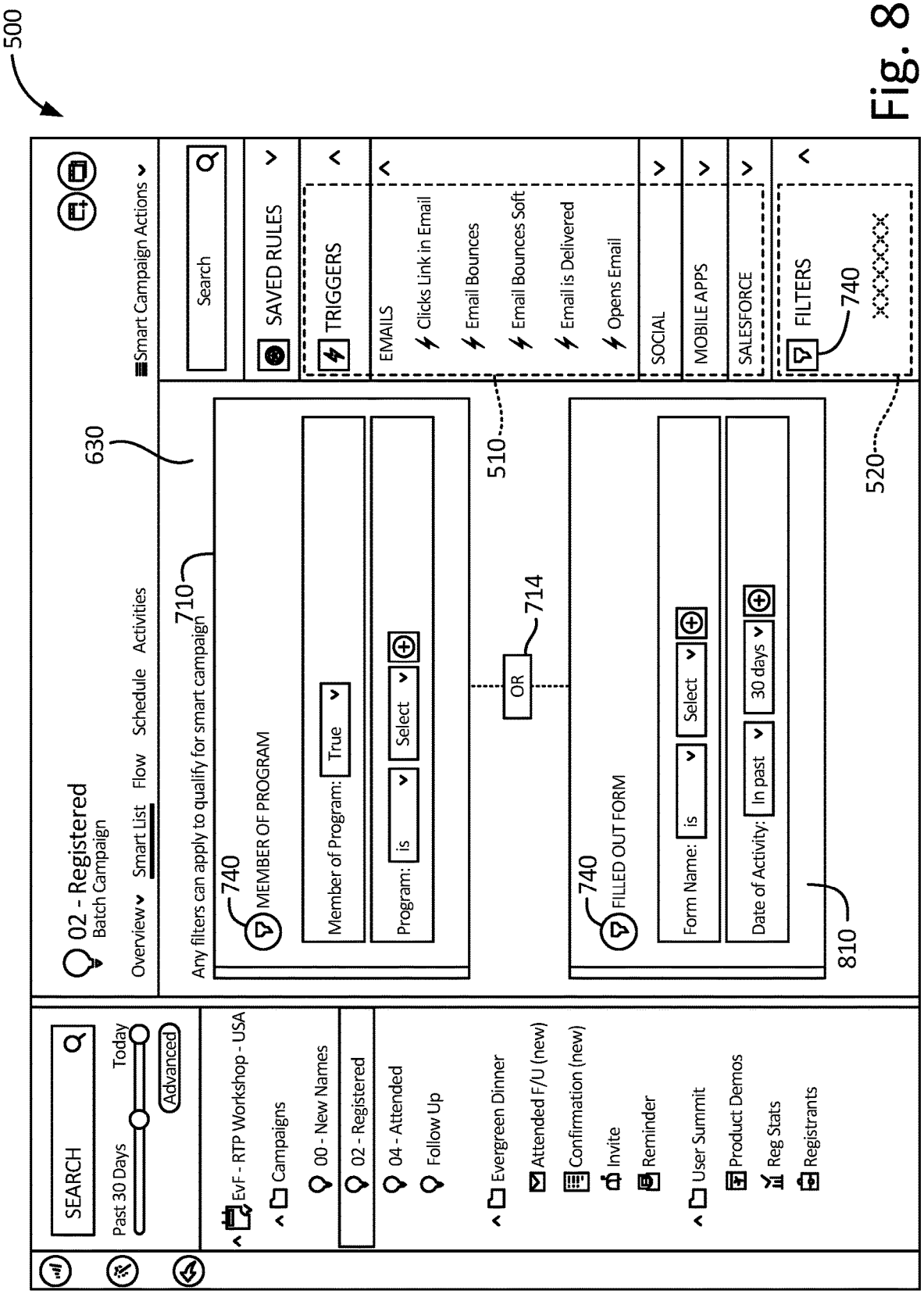
FIG. 8 is a GUI associated with the inventive marketing campaign system that displays two filter cards in response to receiving two inputs for filters, according to an example embodiment.

FIG. 8 is a GUI associated with the inventive marketing campaign system that displays two filter cards in response to receiving two inputs for filters, according to an example embodiment. The marketing campaign shown in FIG. 8 is a batch campaign which uses filters or customer attributes to define a group of customers to act on. The user has indicated that the person or people to whom actions will flow for this batch marketing campaign can be a "MEMBER OF PROGRAM", as depicted by filter card 710 OR a person who "FILLED OUT FORM" as depicted by filter card 810. The legend above the filter card 710 states the "Any filter can apply to qualify for smart campaign" which is consistent with the "OR" logical operator 714 situated between the filter card 710 and the filter card 810.

In a batch marketing campaign, no events would be placed on the smart list. Filter cards, such as 710, 810 would be displayed in the smart list area 630. Two filter cards 710, 810 include filters or attributes of the people or group of people that will be selected for the campaign are shown in the display 500 depicted in FIG. 8. A logic gate 714 is a logical operator that defines the logical relation between the first attribute set forth in the first filter card 710 and the second attribute set forth and displayed as the second filter card 810.

Figure 9:
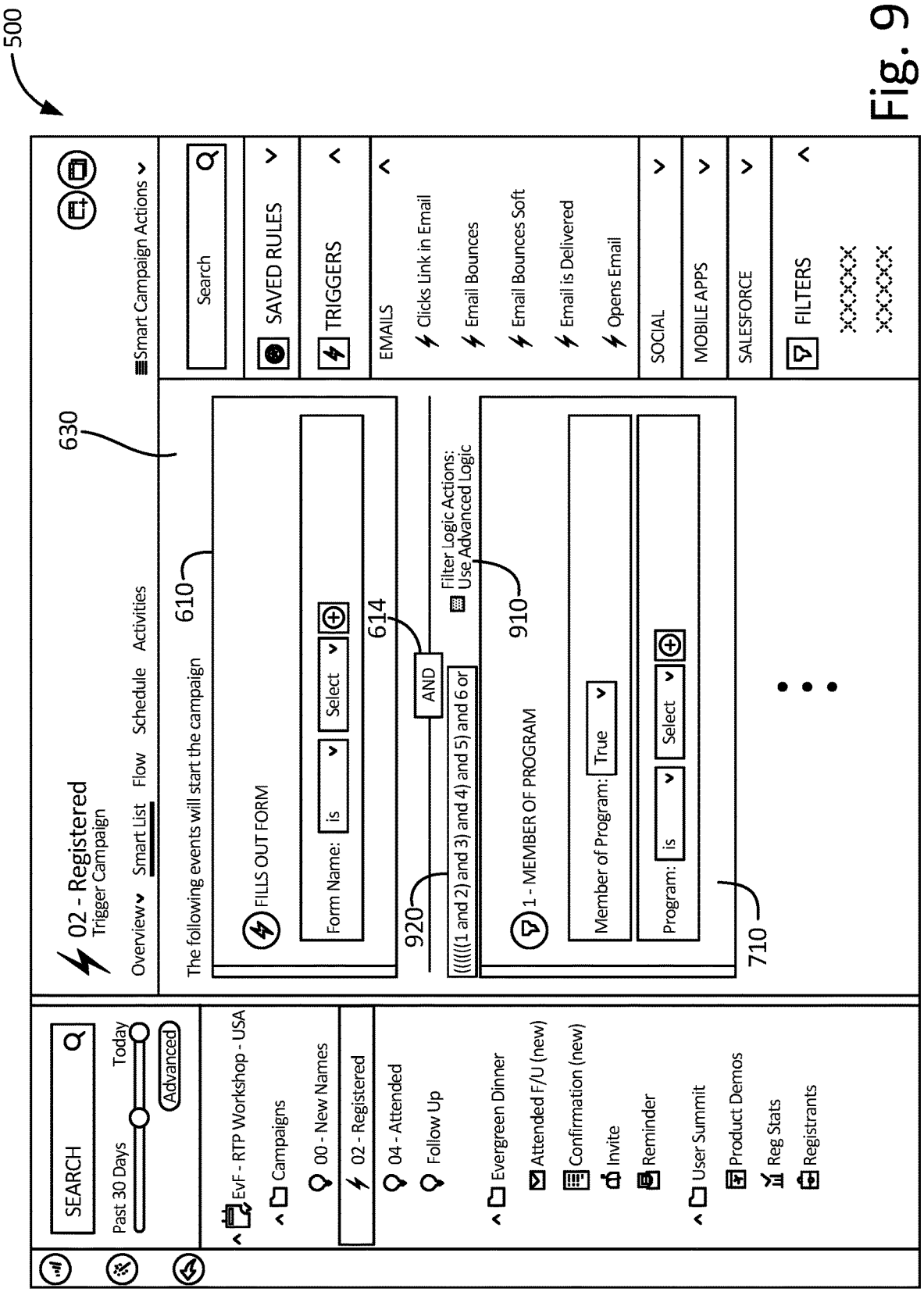
FIG. 9 is a GUI associated with the inventive marketing campaign system that uses advanced input that displays the marketing campaign as a logical Boolean expression in response to a selection of an "advanced" input, according to an example embodiment.

FIG. 9 is a GUI associated with the inventive marketing campaign system that displays the marketing campaign as a logical expression in response to an "advanced" input, according to an example embodiment. FIG. 9 shows the smart list area after an event input has been received and an event card 610 has been displayed in the smart card list area 630. In addition, a filter card 710 is also shown. The filter card 710 is added in response to a filter or attribute input is received. A Boolean operator 614 is shown between the filter card 710 and the event card 610. When using the "advanced" feature or in response to an input to use the "advanced" feature the filter cards are numbered so that the logical expression relates to the filter cards associated with the campaign. As shown, the Boolean operator is an "AND" operation between the event card and filter card number 1. The filter cards associated with the batch campaign are numbered and the logical expression between the various attributes is set forth in the formula field as numbers. As shown, the logical expression relates seven filter cards. The other six filter cards will be shown off this display. The other six filter cards can be seen by a user after the user scrolls down to other portions of the smart list 630. It will be appreciated that the cards shown here can also be added to. In addition, it will be appreciated that many more cards can be added and only a few will be displayed on the smart list area 630. Any un-displayed cards can be accessed or seen by moving into the smart list display area 630 that is not shown currently on the display. FIG. 9 shows the top of the smart list display area since the event card will be the first listed portion of a trigger campaign. It will also be appreciated that some seasoned practitioners in formulating a marketing campaign may also be more comfortable just viewing the logic. FIG. 9 shows another embodiment in which a set of "FILTER LOGIC ACTIONS" are shown in the form of a pull-down menu 910. The various FILTER LOGIC ACTIONS include one of three options. One of the actions is to "use Advanced Logic". The GUI 500 places a prompt for advanced logic 910 on the display 500. In response to an input to use the advanced logic 910, a formula field text box 920 is shown and populated with the Boolean logic used for the marketing campaign. Each filter card is provided or assigned an identifier or number. Event cards, such as card 610, are not assigned numbers, as they always trigger the start of the campaign. Each filter card 710 is provided with or assigned with an identification number. The logical expression is at least for cards identified with numbers 1-6. The other cards cannot be seen on the portion of the display 500 shown. More specifically, the other cards can be seen or accessed by scrolling down in the smart list area 630. However, the logic associated with the marketing campaign can be shown as logic in the formula field 920. The logic shown at the formula field 920 depicts a number of nested operations. In other words, a complex marketing display can be seen in the area 920. It should also be noted that, in some embodiments, only a portion of the logical expression is shown in the box and that the entire expression can be viewed by moving the cursor to the end of the box 920. In this instance, it appears that there is further logic that includes identifiers for additional cards. The additional filter cards are depicted by a set of dots below the filter card 710 shown.

FIGS. 7A and 9 show examples of triggered marketing campaigns. As noted, the event card 610 has different markings than the filter cards 710, 810. As shown in FIGS. 7A and 9, the event card includes a lightning bolt symbol and each filter card 710, and the filter card 810 (shown in FIG. 8) includes a triangular symbol 840. These symbols denote the types of cards shown in a trigger marketing campaign. In other embodiments, other markings may be used to further differentiate the types of cards. For example, the borders of the event card could be a different color when compared to the border of the filter card. The color of each card could be placed around the symbols for the triggers and the filters, in some embodiments.

Advantageously, the marketing campaign technique shown at the GUI allows for faster implementation of a marketing campaign by those marketing professionals less familiar with Boolean logic or Boolean expressions. Once set up, data about the marketing campaign, such as events and filters, can be more quickly reviewed. The marketing campaign of the instant embodiments can be reviewed by scrolling downward or upward or by flipping through pages (up or down). Other marketing campaigns, such as those resembling a journey, require the marketer to move along a vertical path and move the screen from side to side. In larger campaigns, the user may also have to move the screen up and down or scroll in addition to moving vertically. This can be cumbersome and the user may lose track of the logic as he or she maneuvers through the various screen movement.

The marketing campaign embodiments discussed above also allow for more flexibility in configuring a marketing campaign. For example, those very experienced in setting up a marketing campaign can quickly press an "advanced" button which transforms the card based marketing campaign to a logical expression. Those familiar with logic can quickly edit the marketing campaign by editing the logical expression. For example, sets of parenthesis can be added to quickly group a set of filters, or the logical operations between various filters can be changed when a Boolean expression representing the logical operations associated with the campaign is displayed to a knowledgeable marketer. Changes can also be made quickly or on-the-fly from either the advanced mode or the "Any Filter Can Apply" mode or the "All Filters Must Apply" mode. These are the three modes available for logic between filter cards. Thus, the embodiments, and the invention as claimed, are directed to an overall improvement in computer functionality. In some of the embodiments, the improvement is in the functionality at the GUI of the computer.

Figure 10:
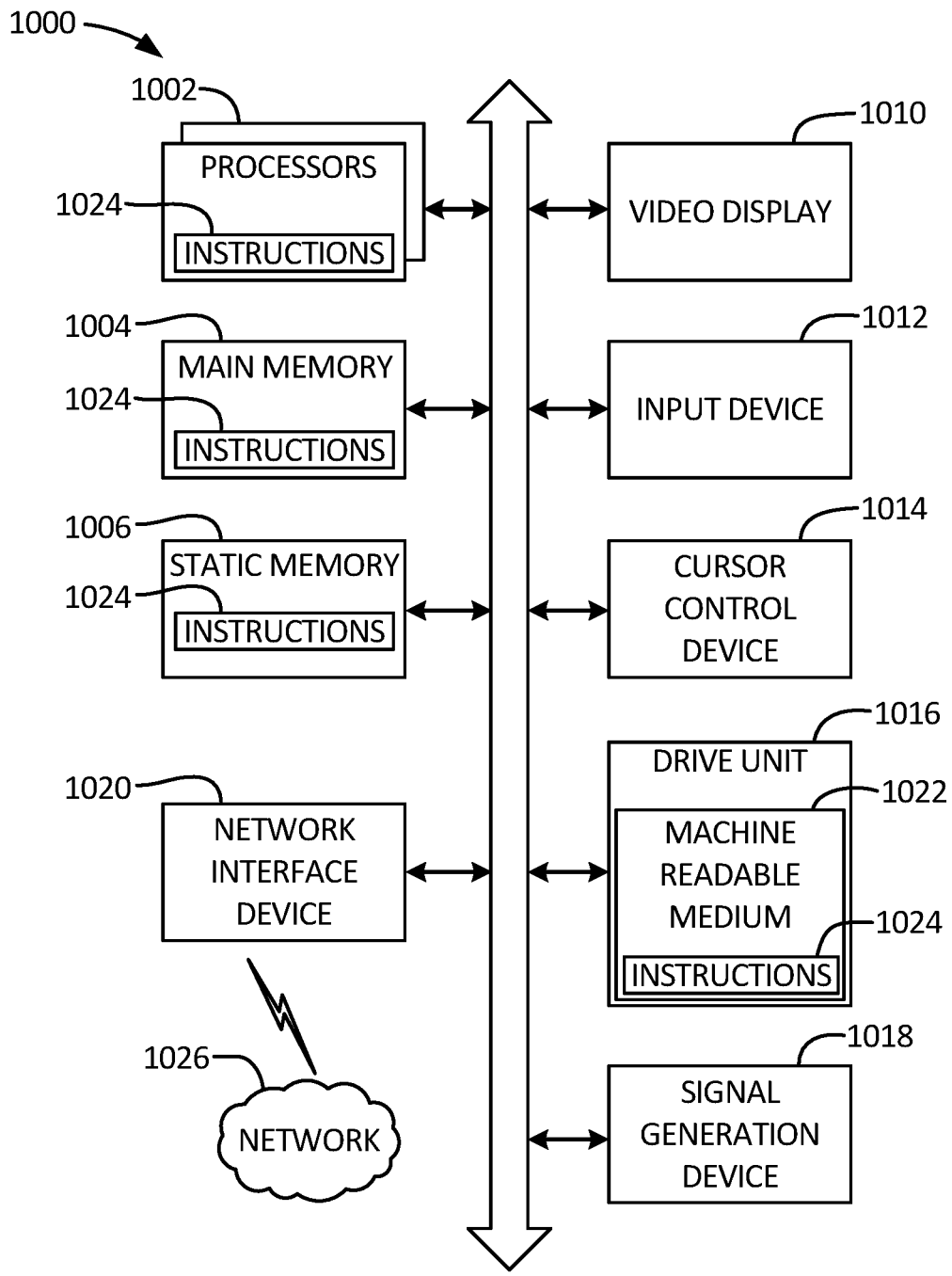
FIG. 10 shows a diagrammatic representation of a computing device for a machine in the example electronic form of a computer system, within which a set of instructions for causing the machine to perform any one or more of the marketing campaign methodologies discussed herein can be executed or adapted to include the apparatus for marketing as described herein, according to an example embodiment.

FIG. 10 shows a diagrammatic representation of a computing device for a machine in the example electronic form of a computer system 1000, within which a set of instructions for causing the machine to perform any one or more of the marketing campaign methodologies discussed herein can be executed or is adapted to include the apparatus for marketing, as described herein. In various example embodiments, the machine operates as a stand-alone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a smart phone, a cellular telephone, a portable music player (e.g., a portable hard drive audio device such as a Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), arithmetic logic unit or all), and a main memory 1004 and a static memory 1006, which communicate with each other via a bus 1008. The computer system 1000 can further include a video display unit 1010 (e.g., a liquid crystal displays (LCD) or a cathode ray tube (CRT) or the like). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a computer-readable medium 1022 on which is stored one or more sets of instructions and data structures (e.g., instructions 1024) embodying or utilized by any one or more of the methodologies or functions described herein. The instructions 1024 can also reside, completely or at least partially, within the main memory 1004 and/or within the processors 1002 during execution thereof by the computer system 1000. The main memory 1004 and the processors 1002 also constitute, or can include, machine-readable media.

The instructions 1024 can further be transmitted or received over a network 1026 via the network interface device 1020 utilizing any one of a number of well-known transfer protocols (e.g., Hyper Text Transfer Protocol (HTTP), CAN, Serial, or Modbus).

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall, accordingly, be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

When the methods, discussed above, are programmed into a memory of a general purpose computer, such as the one described in FIG. 10, the computer and instructions form a special purpose machine. The instructions, when programmed into a memory of a general purpose computer, are in the form of a non transitory set of instructions. The example embodiments described herein can be implemented in an operating environment comprising computer-executable instructions (e.g., software) installed on a computer, in hardware, or in a combination of software and hardware. Modules as used herein can be hardware including circuitry for executing instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™ Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The present disclosure refers to instructions that are received at a memory system. Instructions can include an operational command, e.g., read, write, erase, refresh, etc., an address at which an operational command should be performed, and the data, if any, associated with a command. The instructions can also include error correction data.

A GUI for a marketing campaign method that includes presenting a prompt for events and filters, receiving an input for an event or filter, and displaying an event or filter as a first card in response to the input for the event or filter. The method also includes receiving an input for another event or filter, displaying the event or filter as a second card in response to the input for another event or filter, and displaying the logical operation between the first card and the second card. Displaying a logical operation between the first card and the second card includes displaying a logical operation as a connector between the event card showing the event and the filter card showing the filter. In some embodiments, the logical operation is a default logical operation associated with the event and the filter. The default logical operation between a first card and a second card is changeable to another logical operation in some example embodiments. It should be noted that in a triggered marketing campaign, the logic between an event and at least one filter is an "AND". The logic between a plurality of filters can be "All Filters Must Apply" or "Any Filters Can Apply" or a mixture that is set forth in an "Advanced" mode. The GUI for a marketing campaign method can also include assigning a first identifier to the first card, assigning a second identifier to the second card, and displaying the first identifier and second identifier and a logical operation relating the first identifier and the second operator as a logical expression. In still further embodiments, the GUI for a marketing campaign method includes presenting a prompt to change the logical expression. In one embodiment, the logic is changed for the filters or attributes associated with a marketing campaign.

A GUI for a marketing campaign method includes presenting a prompt for an event, receiving an input for an event, and displaying an event as an event card in response to the input for that event. The GUI for the marketing campaign method also includes presenting a prompt for at least one filter, receiving an input for at least one of filter, and displaying the at least one filter as a card in response to the input for the at least one filter. A logical operation is associated with the event and the at least one filter. The GUI displays the logical operation between the event card and the filter card. The logic is an "AND" operation when logic is between an event and a filter. Associating a logical operation with the event and the at least one filter includes displaying a logical operation as a connector between the card showing the event and the card showing the filter. In one embodiment, the logical operation is a default logical operation associated with the event and the filter. In another embodiment, the default logical operation is an "AND" operation. In still a further embodiment, the GUI for a marketing campaign method includes receiving a plurality of inputs for a plurality of filters, and receiving a plurality of inputs for a plurality of logic operations amongst the plurality of filters. A default logical operation can be associated between the pluralities of filters displayed as filter cards. The default logical operation associated between a first filter card and a second filter card can be either an "AND" logical operation or an "OR" logical operation. The GUI for a marketing campaign method can also include a prompt for changing the default logical operation between a first filter card and a second filter card. In some embodiments, the marketing campaign method also includes assigning numbers to the at least one filter card, and displaying the numbers and their relationship to other event cards and filter cards as a logical expression.

A GUI for a marketing campaign method includes presenting a prompt for a first filter, receiving an input for the first filter, and displaying the first filter as a first filter card in response to the input for the first filter. The GUI for a marketing campaign method also includes presenting a prompt for a second filter, receiving an input for the second filter, and displaying the second filter as a second filter card in response to the input for the second filter. The GUI for a marketing campaign method also includes associating a logical operation with the first filter card and the second filter card, and displaying the logical operation between the first filter card and the second filter card. The GUI for a marketing campaign method of can include associating a default logical operation between the first filter card and the second filter card. In one embodiment, the default logical operation associated between a first filter card and a second filter card is an "AND" logical operation. The default logical operation between a first filter card and a second filter card, in some embodiments, is changeable to another logical operation. In another embodiment, the GUI for a marketing campaign method also includes presenting a prompt to display the first filter card, the second filter card and the logical operation between the first filter card and the second filter card as a logical expression. This is accomplished by assigning a first number to a first filter card, assigning a second number to a second filter card, and displaying the Boolean expression as a first number and a second number with a logical operation between the first number and the second number. The GUI for a marketing campaign method further includes defining a flow of one or more actions that will occur at one or more times, and starting the flow at a determined time when a group of individuals has the attributes defined by the first filter, the second filter and the logical operation between the first filter and the second filter. The group can be a number of individuals or can be a single individual. The attributes, and the logic between the attributes, define the group for a batch campaign.

A non-transitory machine-readable medium providing instructions to that, when executed by a machine that includes a GUI, causes the machine to perform operations that include presenting a prompt for an event at a GUI, receiving an input for an event, displaying an event as an event card at the GUI in response to the input for that event, presenting a prompt for at least one filter at a GUI, receiving an input for at least one filter, and displaying the at least one filter as a filter card at the GUI in response to the input for the at least one filter. The instructions also associate a logical operation with the event and the at least one filter, and displays the logical operation between the event card and the filter card at the GUI. The logical operation will be an "AND" operation between an event and a filter, in one embodiment. The non-transitory machine-readable medium also provides instructions that, when executed by a machine, cause the machine to perform operations for associating a logical operation with the event that further includes displaying a logical operation at the GUI. The logical operation associated with the event as a connector between the event card the filter card. In some embodiments, a default logical operation at the GUI between the event card and the filter card.

Figure 11:
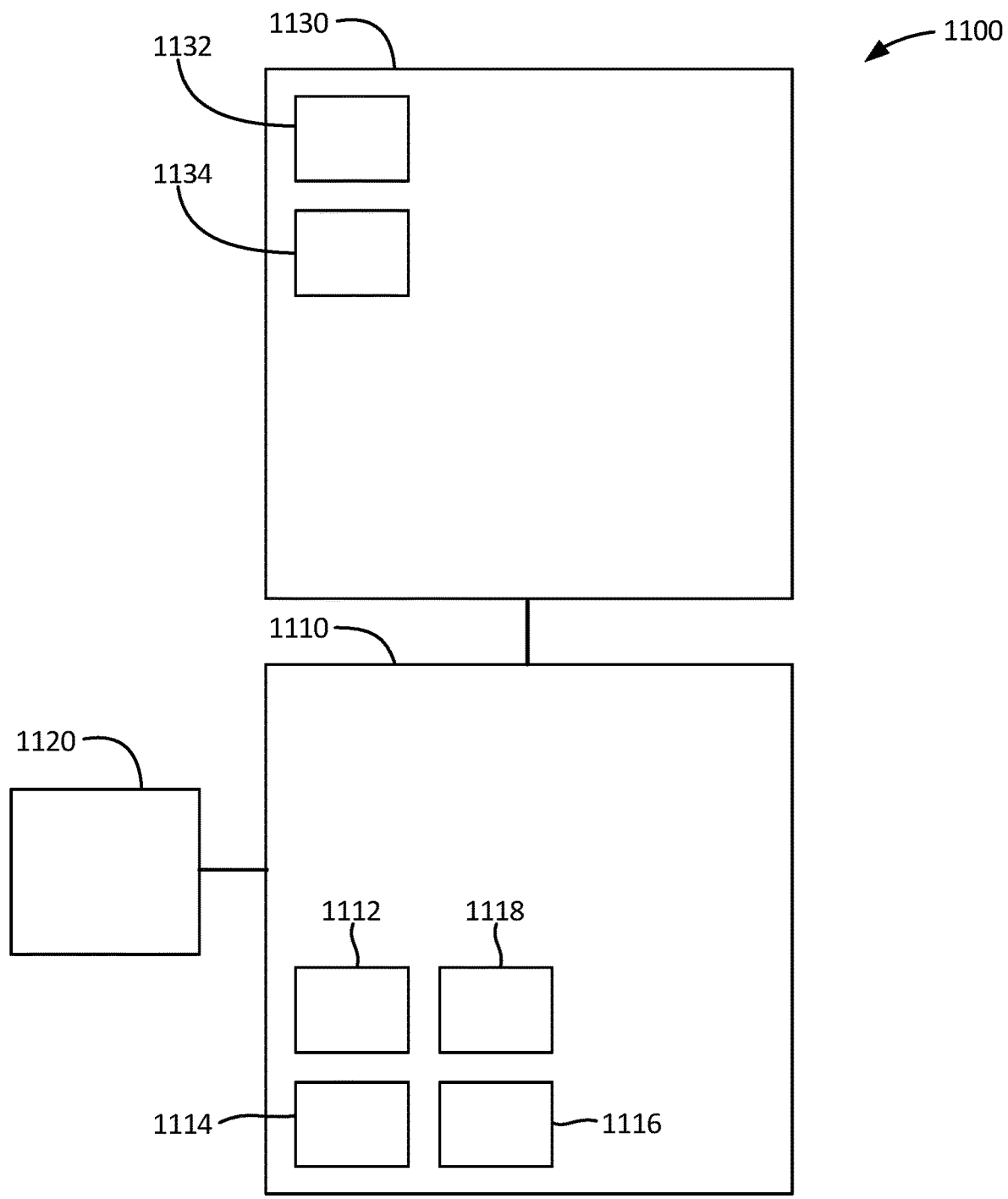
FIG. 11 is a schematic view of a computer system 1100 for generating a graphical user interface ("GUI"), according to an example embodiment.

FIG. 11 is a schematic view of a computer system 1100 for generating a graphical user interface ("GUI") according to an example embodiment. The computer system 1100, a microprocessor 1110, memory 1120, and a display 1130. The computer system 1100 also includes a plurality of modules which will be further discussed below. The modules can be made primarily with software (a set of instructions executable on a microprocessor 1100), or primarily with computer hardware or can be a mixture of hardware and software. In this schematic of the computer system 1100, the modules are shown as portions of the microprocessor. It should be noted that the modules could be shown in memory or as standalone devices. The computer system 1100 includes an event prompt module 1112, a filter prompt module 1114, and a logic module 1116. The event prompt module 1112 presents a prompt for an event. Upon receiving an input for an event at the event prompt module 1112, a microprocessor represents an event as an event card (shown in FIG. 6-9) at the display 1130 in response to the input for that event. The filter prompt module 1114 presents a prompt for at least one filter. Upon receiving an input for at least one of filter at the filter prompt module 1114, the microprocessor presents the at least one filter as a filter card (shown in FIGS. 7A-9) at the display 1120. The logic module 1116 associates a logical operation with the event and the at least one filter, and determines the logical operation displayed between the event card and the filter card. In one example embodiment, the display 1130 represents the logical operation as a logical connector 714 (see FIGS. 7A-9) between the event card and the filter card. The logic module 1116 associates a default logical operation between the event and the filter, namely an "AND" operation. The computer system 1100 can also include a plurality of filter cards wherein a default logical operation 714 (see FIGS. 6A, 6B, 7A and 7B) is displayed between at least two filter cards to define the association of the at least two filters, wherein the default logical operation is one of an "AND", "OR", or "XOR" operation. In some embodiments, the computer system can present prompts resulting in a change default prompt 1132. The change default prompt 1132 is for changing a default operator between the at least two filter cards. Some embodiments include an advanced prompt 1134. The advanced prompt 1134 numbers the filter cards, and presents a logical expression representative of the relationship between the plurality of filter cards in response to an input received from a response to the advanced prompt.

Figure 12:
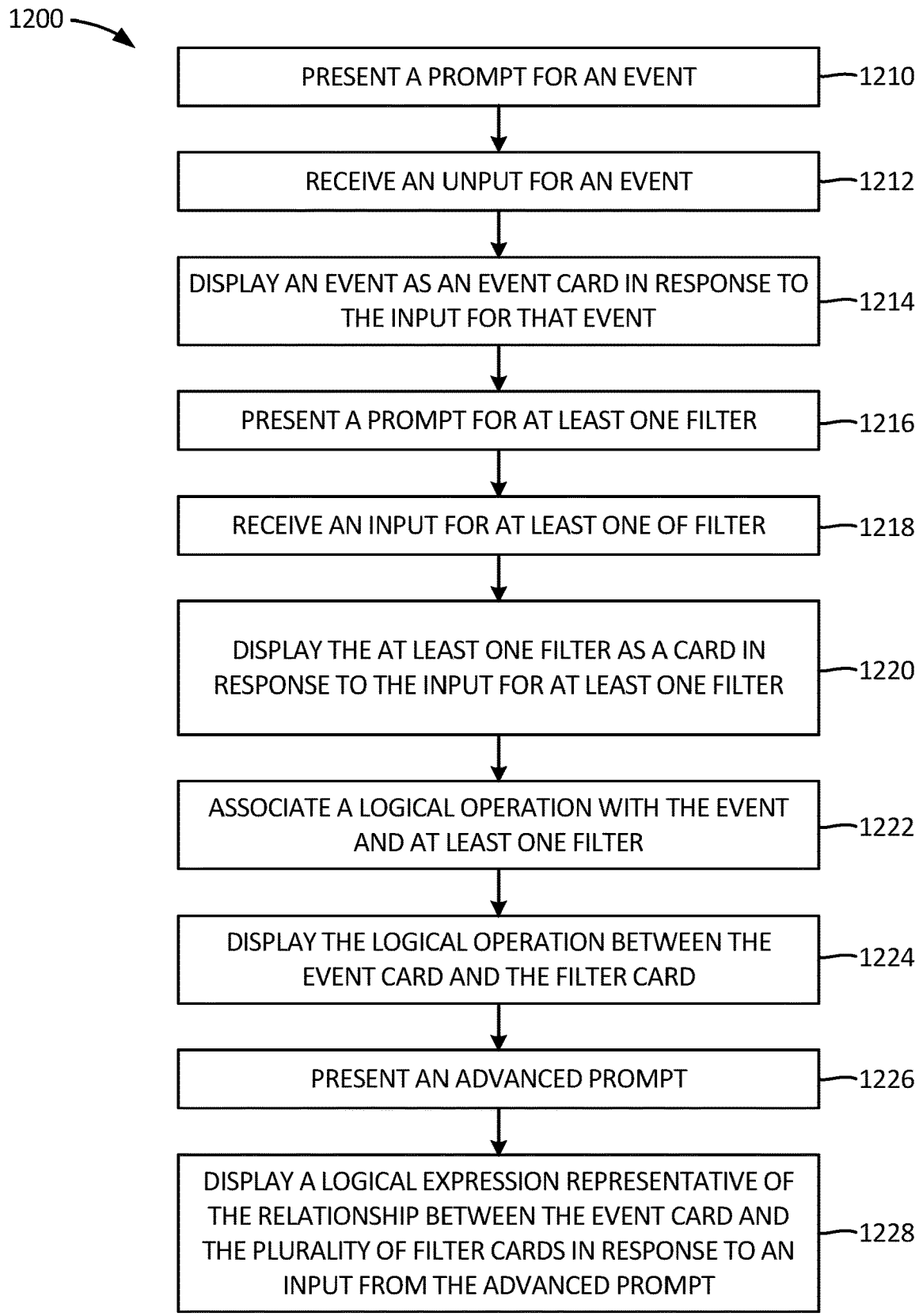
FIG. 12 is a flow chart of a computerized method for generating a graphical user interface ("GUI"), according to an example embodiment.

FIG. 12 is a flow chart of a computerized method 1200 for generating a graphical user interface ("GUI"), according to an example embodiment. The computer implemented method 1200 for generating a GUI includes presenting a prompt for an event 1210, receiving an input for an event 1212, and displaying an event as an event card in response to the input for that event 1214. The method 1200 also includes presenting a prompt for at least one filter 1216, receiving an input for at least one filter 1218; and displaying the at least one filter as a card in response to the input for the at least one filter 1220. The method 1200 also includes associating a logical operation with the event and the at least one filter 1222, and displaying the logical operation between the event card and the filter card 1224. A logical operation is associated with the event and the at least one filter. Associating 1224 includes displaying a logical operation as a connector between the event and the filter card showing the filter. The logical operation, in some embodiments, is a default logical operation associated with the event and the filter. In some example embodiments, the default logical operation is an "AND" operation. In still other embodiments, a plurality of filter cards are displayed and a default logical operation is displayed between at least two filter cards to define the association of the at least two filters. The default logical operation is one of an "AND" or "OR" operation. A prompt can be provided to change a default operator between the at least two filter cards to another logical operator. The computer implemented can also include presenting an advanced prompt 1226, and displaying a Boolean expression representative of the relationship between the event card and the plurality of filter cards in response to an input from the advanced prompt 1228.

A computer system for generating a graphical user interface ("GUI") includes means for presenting a prompt for an event, means for receiving an input for an event, and means for displaying an event as an event card in response to the input for that event. The computer system also includes means for presenting a prompt for at least one filter, means for receiving an input for at least one of filter, and means for displaying the at least one filter as a card in response to the input for the at least one filter. The computer system also includes means for associating a logical operation with the event and the at least one filter, and means for displaying the logical operation between the event card and the filter card. The means for associating a logical operation with the event and the at least one filter includes means for displaying a logical operation as a connector between the event card and the filter card showing the filter. The logical operation is a default logical operation associated with the event and the filter, and the default logical operation is an "AND" operation. Another embodiment of the computer system includes displaying a plurality of filter cards wherein a default logical operation is displayed between at least two filter cards to define the association of the at least two filters. The default logical operation is one of an "AND" or an "OR" operation. The computer system also a default logic change prompt for changing a default operator between the at least two filter cards. In yet another embodiment, the computer system also includes means for presenting an advanced prompt. When an input is received to the advanced prompt, a logical expression representative of the relationship between the plurality of filter cards is displayed.

This has been a detailed description of some exemplary embodiments of the invention(s) contained within the disclosed subject matter. Such invention(s) can be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments can be utilized and changes can be made without departing from the scope of the inventive subject matter. Thus, although specific embodiments have been illustrated and described herein, any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer implemented method comprising:
   presenting, within a graphical user interface displayed on a client device, an event prompt area comprising one or more event prompts corresponding to one or more events configured to trigger an action flow of a campaign;
   receiving, via the client device, a first input comprising selection of an event prompt from the one or more event prompts;
   generating an event card representing the event prompt in response to receiving the first input, wherein the event card comprises a first selectable option to further specify an event corresponding to the event prompt;
   presenting, within the graphical user interface displayed on the client device, a filter prompt area comprising one or more filter prompts corresponding to one or more filters configured to define a group of users that can receive the action flow of the campaign by performing the event indicated by the event prompt;
   receiving, via the client device, a second input comprising selection of at least one filter prompt from the one or more filter prompts;
   generating at least one filter card representing the at least one filter prompt in response to receiving the second input, wherein the at least one filter card comprises a second selectable option to further specify a filter corresponding to the at least one filter prompt;
   presenting, within a campaign structure area of the graphical user interface displayed on the client device while simultaneously presenting the event prompt area and the filter prompt area within the graphical user interface, a campaign structure comprising the event card, the at least one filter card, and a logical operation associating the event corresponding to the event card and the filter corresponding to the at least one filter card;
   determining that the action flow of the campaign should be triggered for a user based on detecting that the user has performed the event indicated by the event prompt;
   in response to determining that the action flow of the campaign should be triggered for the user, determining whether the user meets the filter specified by the at least one filter prompt; and
   commencing the action flow of the campaign for the user based on the user meeting the filter specified by the at least one filter prompt.

2. The computer implemented method of claim 1, wherein providing the campaign structure comprising the event card, the at least one filter card, and the logical operation comprises displaying the logical operation as a logical connector between the event card and the at least one filter card.

3. The computer implemented method of claim 1, wherein the logical operation comprises a default logical operation associating the event and the filter.

4. The computer implemented method of claim 1, wherein: the at least one filter prompt comprises a plurality of filter prompts; generating the at least one filter card representing the at least one filter prompt comprises generating a plurality of filter cards representing the plurality of filter prompts; and the campaign structure comprises the plurality of filter cards and logical operations associating filters corresponding to the plurality of filter cards, one or more filter cards from the plurality of filter cards being provided outside an initial display of the campaign structure area.

5. The computer implemented method of claim 4, further comprising providing, within the campaign structure area of the graphical user interface displayed on the client device, a prompt for changing the logical operations associating the filters corresponding to the plurality of filter cards.

6. The computer implemented method of claim 4, further comprising; presenting, within the campaign structure area of the graphical user interface displayed on the client device, a prompt for advanced logic; receiving a user selection of the prompt for advanced logic; and in response to receiving the user selection: assigning a value to each filter card from the plurality of filter cards; and providing, within the initial display of the campaign structure area, a logic formula comprising the value for each filter card from the plurality of filter cards and the logical operations associating the filters corresponding to the plurality of filter cards.

7. A non-transitory computer readable storage medium, comprising instructions that, when executed by at least one processor, cause a computing device to:
   generate a graphical user interface that simultaneously displays, on a client device: an event prompt area comprising one or more event prompts corresponding to one or more events configured to trigger an action flow of a campaign;
   a filter prompt area comprising one or more filter prompts corresponding to one or more filters configured to define a group of users that can trigger the action flow of the campaign by performing an event indicated by a selected event prompt; and
   a campaign structure area;
   receive a first input comprising selection of an event prompt from the one or more event prompts;
   generate an event card representing the event prompt in response to receiving the first input, wherein the event card comprises a first selectable option to further specify the event corresponding to the event prompt;
   receive a second input comprising selection of at least one filter prompt from the one or more filter prompts;
   generate at least one filter card representing the at least one filter prompt in response to receiving the second input, wherein the at least one filter card comprises a second selectable option to further specify a filter corresponding to the at least one filter prompt;
   provide, for display within the campaign structure area while simultaneously presenting the event prompt area and the filter prompt area for display, a campaign structure comprising the event card, the at least one filter card, and a logical operation associating the event corresponding to the event card and the filter corresponding to the at least one filter card;
   determine that the action flow of the campaign should be triggered for a user based on detecting that the user has performed the event indicated by the event prompt;
   in response to determining that the action flow of the campaign should be triggered for the user, determine whether the user meets the filter specified by the at least one filter prompt; and
   commence the action flow of the campaign for the user based on the user meeting the filter specified by the at least one filter prompt.

8. The non-transitory computer readable storage medium of claim 7, wherein the instructions, when executed by the at least one processor, cause the computing device to provide the campaign structure for display within the campaign structure area by displaying the logical operation as a logical connector between the event card and the at least one filter card.

9. The non-transitory computer readable storage medium of claim 7, wherein the logical operation comprises a default logical operation associating the event and the filter.

10. The non-transitory computer readable storage medium of claim 9, wherein the default logical operation is an "AND" operation.

11. The non-transitory computer readable storage medium of claim 7, wherein: the at least one filter prompt comprises a plurality of filter prompts; and the instructions, when executed by the at least one processor, cause the computing device to: generate the at least one filter card representing the at least one filter prompt by generating a plurality of filter cards representing the plurality of filter prompts; and provide the campaign structure by providing the plurality of filter cards and logical operations associating filters corresponding to the plurality of filter cards, one or more filter cards from the plurality of filter cards being provided outside an initial display of the campaign structure area.

12. The non-transitory computer readable storage medium of claim 11, further comprising instructions that, when executed by the at least one processor, cause the computing device to provide, within the campaign structure area, a prompt for changing the logical operations associating the filters corresponding to the plurality of filter cards.

13. The non-transitory computer readable storage medium of claim 11, further comprising instructions that, when executed by the at least one processor, cause the computing device to: present, within the campaign structure area of the graphical user interface displayed on the client device, a prompt for advanced logic; receive a user selection of the prompt for advanced logic; and in response to receiving the user selection: assign a value to each filter card from the plurality of filter cards; and provide, within the initial display of the campaign structure area, a logic formula comprising the value for each filter card from the plurality of filter cards and the logical operations associating the filters corresponding to the plurality of filter cards.

14. A computer system comprising:
at least one server; and
at least one non-transitory computer readable storage medium comprising instructions that, when executed by the at least one server, cause the system to:
provide, for display within a graphical user interface displayed on a client device, an event prompt area comprising one or more event prompts corresponding to one or more events configured to trigger an action flow of a campaign;
receive, via the client device, a first input comprising selection of an event prompt from the one or more event prompts;
generate an event card representing the event prompt in response to receiving the first input, wherein the event card comprises a first selectable option to further specify an event corresponding to the event prompt;
present within the graphical user interface displayed on the client device while simultaneously presenting the event prompt area within the graphical user interface, a filter prompt area comprising one or more filter prompts corresponding to one or more filters configured to define a group of users that can trigger the action flow of the campaign by performing the event indicated by the event prompt;
receive, via the client device, a second input comprising selection of at least one filter prompt from the one or more filter prompts;
generate at least one filter card representing the at least one filter prompt in response to receiving the second input, wherein the at least one filter card comprises a second selectable option to further specify a filter corresponding to the at least one filter prompt;
present within a campaign structure area of the graphical user interface displayed on the client device while simultaneously presenting the event prompt area and the filter prompt area within the graphical user interface, a campaign structure comprising the event card, the at least one filter card, and a logical operation associating the event corresponding to the event card and the filter corresponding to the at least one filter card,
determine that the action flow of the campaign should be triggered for a user based on detecting that the user has performed the event indicated by the event prompt;
in response to determining that the action flow of the campaign should be triggered for the user, determine whether the user meets the filter specified by the at least one filter prompt; and
commence the action flow of the campaign for the user based on the user meeting the filter specified by the at least one filter prompt.

15. The computer system of claim 14, wherein the instructions, when executed by the at least one server, cause the computer system to provide the campaign structure comprising the event card, the at least one filter card, and the logical operation by displaying the logical operation as a logical connector between the event card and the at least one filter card.

16. The computer system of claim 14, wherein the logical operation comprises a default logical operation associating the event and the filter.

17. The computer system of claim 16, wherein the default logical operation is an "AND" operation.

18. The computer system of claim 14, wherein: the at least one filter prompt comprises a plurality of filter prompts; and the instructions, when executed by the at least one server, cause the computer system to: generate the at least one filter card representing the at least one filter prompt by generate a plurality of filter cards representing the plurality of filter prompts; and provide the campaign structure by providing the plurality of filter cards and logical operations associating filters corresponding to the plurality of filter cards, one or more filter cards from the plurality of filter cards being provided outside an initial display of the campaign structure area.

19. The computer system of claim 18, further comprising instructions that, when executed by the at least one server, cause the computer system to provide, within the campaign structure area, a prompt for changing the logical operations associating the filters corresponding to the plurality of filter cards.

20. The computer implemented method of claim 1, wherein: the filter corresponding to the at least one filter prompt corresponds to users omitted from a customer database; determining whether the user meets the filter specified by the at least one filter prompt comprises determining that the user is not included in the customer database; and commencing the action flow of the campaign for the user comprises sending a message to an additional client device associated with the user welcoming the user as a new customer.

* * * * *